United States Patent
Luner et al.

[15] 3,664,939
[45] May 23, 1972

[54] ISOELECTRIC FOCUSING AND FRACTIONATION AMPHOLYTES IN THERMALLY ENGENDERED PH GRADIENTS

[72] Inventors: Stephen J. Luner, Sherman Oaks; Alexander Kolin, Bel Air, both of Calif.

[73] Assignee: Regents of the University of California, Berkeley, Calif.

[22] Filed: Apr. 22, 1970

[21] Appl. No.: 30,712

[52] U.S. Cl. .................................... 204/180 R, 204/299
[51] Int. Cl. ............................... B01k 5/00, B01d 59/42
[58] Field of Search ......................... 204/299, 180, 198

[56] References Cited

UNITED STATES PATENTS

| | | | |
|---|---|---|---|
| 2,566,308 | 9/1951 | Brewer | 204/299 X |
| 3,170,860 | 2/1965 | Morin, Jr. | 204/195 |
| 3,205,158 | 9/1965 | Renier | 204/195 |
| 3,240,692 | 3/1966 | Donnelly | 204/180 |
| 3,336,212 | 8/1967 | Nicholas et al. | 204/195 |
| 3,355,375 | 11/1967 | Badgley | 204/299 |
| 3,413,208 | 11/1968 | Barg, Jr. et al. | 204/299 X |
| 3,453,200 | 7/1969 | Allington | 204/299 X |
| 3,497,438 | 2/1970 | Badgley | 204/180 |

OTHER PUBLICATIONS

Waldmann- Meyer, " Zone Electrophoresis: Protein Mobilities and Ion Binding," Chromatographic Reviews, (1963) Vol. 5, QD 271 C5 C.2 pp 22 and 23 and 24

Primary Examiner—John H. Mack
Assistant Examiner—A. C. Prescott
Attorney—Jessup & Beecher

[57] ABSTRACT

A method is provided for converting extended volumes of mixtures of proteins, or other ampholytes, into an isoelectric spectrum, or sorting pattern, of sharp narrow ampholyte zones located at points of a pH gradient corresponding to the isoelectric pH value of the individual ampholytes. A temperature gradient is established in an electrophoretic buffer column, and the temperature gradient provides a stable pH gradient which can be easily controlled by variations of the temperature limits, and which remains stable when an electric current is passed through the buffer column.

19 Claims, 1 Drawing Figure

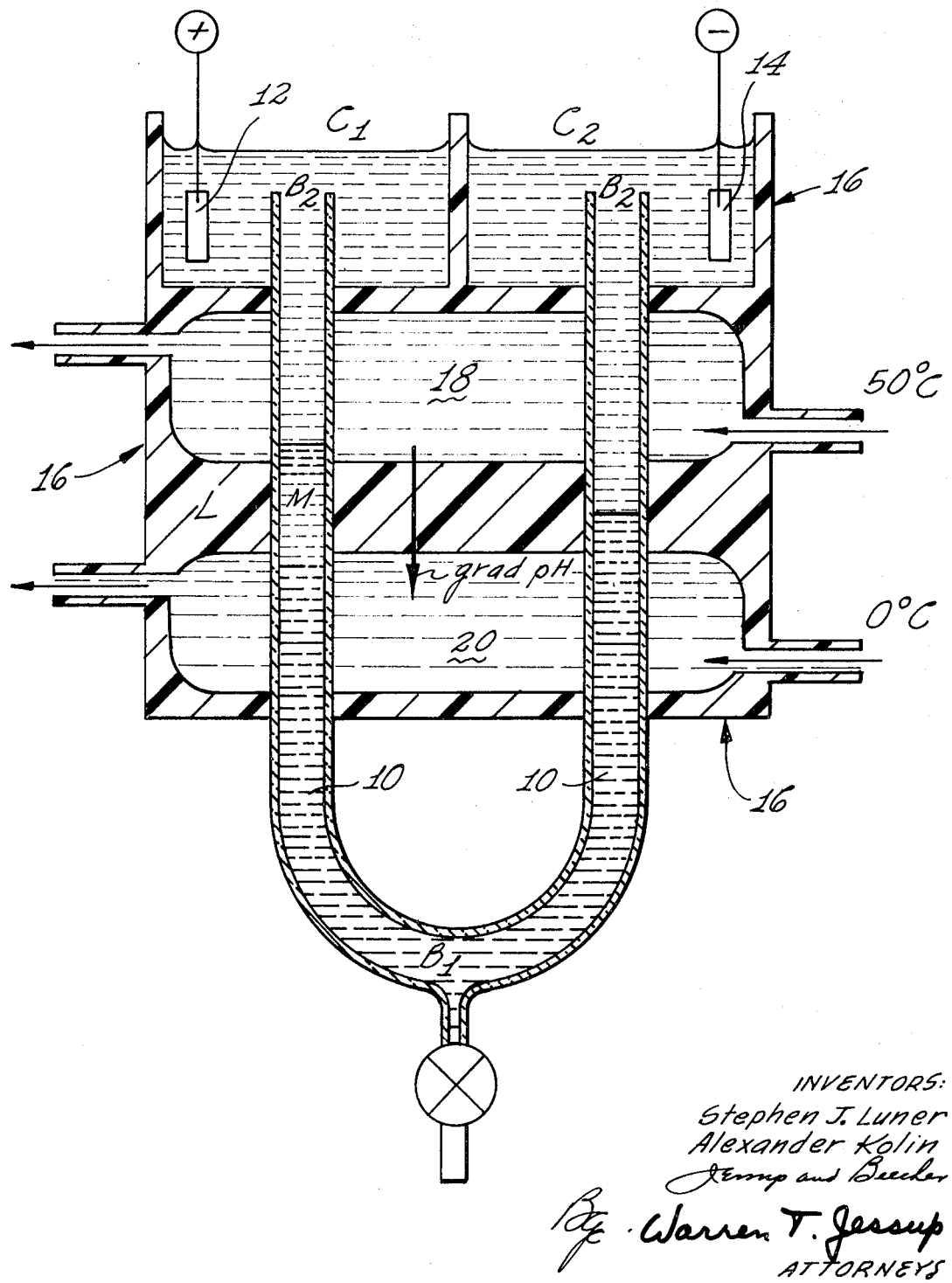

ISOELECTRIC FOCUSING AND FRACTIONATION AMPHOLYTES IN THERMALLY ENGENDERED PH GRADIENTS

BACKGROUND OF THE INVENTION

Fluids which are of interest to the physician, biologist, biochemist and chemist, as well as to the microbiologist, are often complicated mixtures containing some components in solution and others in suspension. The separation and characterization of these components constitute a problem of basic importance. Physical techniques such as ultra-centrifugation and electrophoresis, are most widely used prior art general methods for accomplishing the aforesaid separation and characterization. The process of the present invention constitutes an improvement over the prior art methods, whereby the components of a given mixture are separated from each other simultaneously and are sorted into a spatial arrangement referred to as an "isoelectric spectrum." The term "spectrum" is used herein to designate a sorting in the same sense as one refers to "mass spectra," "energy spectra," and the like. In the separation of ampholytes, such as proteins, polypeptides, amino acids, and the like, special use can be made of the existence of an isoelectric point, in order to obtain particularly sharp and stable "spectra."

The principle of the prior art process is based on the fact that ions of proteins, as well as other ampholytes, are positively charged at pH values below the isoelectric point and negatively charged at the higher pH values. By creating and maintaining a field of varying hydrogen ion concentration in a solution traversed by an electric current, it is possible to make the ampholytes converge from both sides towards points at which the pH value is equal to the isoelectric pH of the ampholyte. Such concentration of the ampholyte at its isoelectric point occurs when the current flows in the direction of increasing pH in the pH field, whereas a diminution in the ampholyte concentration at a point corresponding to its isoelectric pH is produced by a current flowing in the direction of diminishing pH values.

For every ampholyte there is a characteristic pH with which the net charge of the molecules is zero, this being referred to as the "isoelectric point." As the protein molecules proceed from the isoelectric point towards increasing pH values, they acquire a negative charge which increases with increasing pH. On the other hand, when the protein molecules proceed towards the acid side of the pH gradient, that is, toward decreasing pH values, they acquire a positive charge which increases as the pH value diminishes.

An electric current flowing through the electrolytic solution in the direction of increasing pH values will cause the positively charged ampholyte ions which are on the acid side of the isoelectric point to move with the current toward the isoelectric point. The ampholyte ions on the basic side of the isoelectric point are negative charged, and hence move contrary to the direction of the current, that is, they also move toward the isoelectric point. Thus the ampholyte ions converge towards the isoelectric point, where all the ampholyte particles can be eventually concentrated. Since different ampholytes have, as a rule, different isoelectric points, the various components of an ampholyte mixture may be separated by concentrating them at their characteristic isoelectric point. The sorting pattern thereby obtained may be referred to as an "isoelectric spectrum."

Electrophoretic mobility has been used for decades as a basis for the separation and characterization of proteins. The resolving power of separations is not high and the characterization by mobility is not unique because of the dependence of the protein mobilities on the pH and ionic strength of the buffers.

In 1954 a new method was proposed for the separation and characterization of proteins on the basis of differences in their isoelectric point (A. Kolin, Journal Chem. Phys., 22 1268 (1954); 41 101 (1955). This approach led in subsequent modifications to unique characterization of proteins and to high resolution in preparative separations (Svensson, *Acta Chem. Scand.* 15, 325 (1961); 20, 820 (1966); Kolin, pH Gradient Electrophoresis "Methods in Medical Research" Volume 12 1970)).

Proteins differeing by as little as 0.01 pH unit in their pI values could be separated by the aforesaid prior art methods. The protein is distributed, for example, in an electrophoretic column in which a pH gradient is maintained by a concomitant density gradient used for stabilization against thermal convection. An electric current directed toward increasing pH sweeps the protein which is positively charged in parts of the column where the pH is less than the pI toward the isoelectric zone where it is arrested due to the loss of charge. Similarly, protein ions which are negatively charged in the regions where the pH is greater than the pI are swept in the direction opposite to the current toward the isoelectric zone where they come to a stop. Thus, eventually all of the protein is condensed in a sharp isoelectric zone whose pH can be measured to ascertain the isoelectric point of the protein. A plurality of protein components differing in their pI value result in a corresponding plurality of sharp isoelectric condensation zones.

In an initial approach, as described in the aforesaid J. Chem. Phys. Proceedings the pH gradient was prepared by appropriate buffer mixture. Rapid isoelectric condensations, or "focusing," have been obtained in such prior art processes in less than 5 minutes. The weakness of this particular prior art implementation of the isoelectric focusing concept is the drift of the pH gradient which makes it impossible to reach a stable, steady-state pattern with each isoelectric protein zone created precisely at its isoelectric point within the pH gradient.

The aforesaid instability was removed in the subsequent prior art processes by creating a stable steady-state pH distribution through achievement of an equilibrium between electromigration and diffusion of buffer ions. This subsequent prior art process, however, is time consuming, in some cases requiring as many as 96 hours. In addition, this particular prior art process requires costly synthetic ampholytes, known as "Ampholines" to buffer the fractionation column. The Ampholines must be removed from the collected fractions by dialysis at the end of the process, and their absorption of ultraviolet light may interfere with the spectro-photometric evaluation of the fractionation.

The process of the present invention constitutes an improvement over the prior art by achieving isoelectric focusing and fractionation stability within a short time span and with a high and easily adjustable resolving power, and without the requirement for the special buffering material such as the "Ampholines." An initial implementation of the process of the invention includes a simple U-tube apparatus filled with a common buffer, such as tris, adjusted to a pH of intermediate value within a range between the highest and lowest pI of the components to be fractionated. A pH gradient is then generated by purely physical means within a few seconds so that isoelectric focusing can begin practically immediately leading to separations within several minutes and within a pH range of about 1 pH unit. The essence of the present invention is the generation of this pH gradient by the establishment of a temperature gradient in the electrophoretic column.

The process of the invention offers a simple and rapid means for identifying and separating different ampholytes such as proteins, polypeptides, amino acids, and the like, in complex mixtures. A method of condensation, or focusing, of extended volumes of mixtures of proteins, or other ampholytes, into an isoelectric spectrum is provided by the process of the invention; the spectrum comprising sharp narrow zones located at points of a pH gradient corresponding to the isoelectric pH values of the individual proteins.

As mentioned briefly above, the process of the invention is based on the establishment of a column of electrolytic solution in which a pH gradient has been established, and which contains an ampholyte in solution, or a suspension of ampholyte-coated particles. The charge on the protein ions, being a function of the pH of the solution, will vary throughout the pH gradient In contradistinction to the currently practiced isoelectric focusing in a "natural pH gradient" which, as mentioned above, may require up to 96 hours for completion, the present method yields clear-cut condensation markings of components corresponding to different isoelectric pH values within about 1 minute, and complete fractionation of the ampholytes within about 15 minutes. Moreover, no "Ampholines" or other special buffers are required in carrying out the process of the invention, and the pH gradient requires only about 10 seconds to be formed, rather than days as is common in the prior art natural pH gradient focusing. The pH gradient is established in the process of the present invention by utilization, for example, of the temperature dependence of the pK. That is, as mentioned above, a pH gradient is established by essentially physical means.

For example, by establishing a temperature gradient between 0° C. and 50° C. in an electrophoretic column, a stable pH gradient in the order of 1 pH unit can be maintained in the column. The pH gradient can be easily controlled by variations of the temperature limits so that high resolving power can be achieved in shallow pH gradients. The pI of the focused fraction is determined by measurement, for example, by a thermistor or resistance thermometer, of the local temperature within each of the isoelectric zones determined by the local pH value. The individual zones can then be pipetted out.

The process on which the present invention is based may be illustrated by simultaneous condensation and evacuation of hemoglobin in two equally oriented pH gradients traversed by opposite currents, and separation of hemoglobin A from hemoglobin S, for example, within 15 minutes, in a pH gradient where the current passes in the direction of increasing pH, in a millimolar tris buffer solution stabilized against convection currents by a sucrose density gradient.

BRIEF DESCRIPTION OF THE DRAWING

The single FIGURE represents in somewhat schematic form suitable apparatus for carrying out the process and concept of the present invention.

DETAILED DESCRIPTION OF THE ILLUSTRATED EMBODIMENT

The method for producing the pH gradient for the isoelectric spectra described above may be implemented by the apparatus shown in the accompanying drawing. The apparatus comprises, for example, a U-tube 10 having a positive electrode 12 at one end and a negative electrode 14 at the other end. The ampholyte mixture which is to be fractionated is dissolved in an electrolyte buffer solution, stabilized against convection currents by a sucrose, or other non-ionized solute density gradient, for example, and introduced into the M zone of the U-tube 10. The portion of the aforesaid solution filling the lower part of the U-tube is a dense sucrose buffer solution, for example, designated as $B_1$. This solution is separated from a less dense sucrose-free buffer solution $B_2$ in the upper portions of the U-tube legs 10, by a layer M of intermediate density in one or both of the legs.

A suitable block designated 16 and formed of lucite, or other appropriate material, surrounds the U-tube 10. The block 16 defines compartments $C_1$ and $C_2$ at its upper end for the buffer solution into which the electrodes 12 and 14 are inserted. The block 16 has an upper chamber 18 in which a warming fluid may circulate to establish, for example, a temperature of 50° C. or other selected temperature. The block 16 also includes a lower chamber 20 through which a cooling fluid flows to establish a second temperature, for example, of the order of 0° C. Therefore, there results a temperature gradient of 50° C. to 0° C. across the lucite barrier L between the chambers 18 and 20, and this temperature gradient is exhibited also in the electrolyte within the U-tube 10 in the region designated M, for example, in the left leg of the U-tube.

As mentioned above, by establishing a temperature gradient, for example, between 0° C. and 50° C. in the electrophoretic column formed within the U-tube 10, a stable pH gradient can be maintained, even when current flows through the electrophoretic column. Moreover, the pH gradient can easily be controlled by variations of the temperature limits established by the two fluids circulated through the chambers 18 and 20, so that high resolving power can be achieved in shallow pH gradients.

Then, assuming that the electrodes 12 and 14 produce the electric field in the proper direction, the current will flow through the electrolyte in the direction of increasing pH values in the left leg of the U-tube, so that the ampholyte ions of the various ampholyte fractions may be caused to congregate toward the various isoelectric points in the pH gradient established in the electrolyte in the region designated M.

The generation of the pH gradient in accordance with a specific example of the method of the present invention is based on the following considerations. In a tris-Hcl buffer the pH is established according to the equilibrium relation:

$$K = (H^+)(tris)/(tris\,H^+) \qquad (1)$$

The variation in hydrogen ion activity of a buffer solution with temperature can be generally expressed logarithmically as:

$$\frac{\partial pa_H}{\partial T} = -\frac{\partial \log K}{\partial T} - (2z+1)\frac{\partial \log Y}{\partial T} \qquad (2)$$

The first of these two terms can be obtained from the gas constant ($R$) and the molar heat of dissociation of an acid, $\Delta H°$:

$$\sigma \ln K / \sigma T = \Delta H° / RT^2 \qquad (3)$$

For the case of tris, the second term is less than 10 percent of the value of the first term and thus can be neglected. If one starts with a buffer of a given pH at room temperature and cools its bottom portion to close to 0° C. and raises the temperature of its top section to, say, 50° C., a shift in the pH values of the top and bottom sections of the buffer column in opposite directions are obtained, and a vertical pH gradient within the buffer column is created, if leakage of heat through the side walls of the column is avoided. The time required for establishment of the pH gradient depens on the rate of heat flow in the system and has been found to be less than 1 minute in the present apparatus.

It is essential to prevent electrolysis products from travelling from the electrodes to the vicinity of the M region, and appropriate protection is achieved either by use of large electrode compartments, or by connecting the compartments $C_1$ and $C_2$ by salt bridges to large adjacent electrode vessels. A voltage of about 200 volts maintains a current of the order of 9 milliamps through the apparatus under normal conditions. The 0° C. and 50° C. circulated through the chambers 20 and 18 may be derived, for example, from an ice water bath and a Precision Thelco constant temperature bath, respectively.

By establishment of the temperature difference in the two chambers 18 and 20, the pH of $B_2$ exceeds that of $B_1$ by as much as one-half to one pH unit depending upon the temperature difference and the choice of buffer. If isoelectric focusing of a protein, for example, hemoglobin, is to be demonstrated, the original buffer pH is chosen so that there will be a point within the thermally established pH gradient at which hemoglobin will be isoelectric at the temperature of the isoelectric zone. For hemoglobin A, 0.025 molar tris-HCl buffer of pH 7.40 at 22° C. may be used. However, other possible buffers with high $\sigma pH/\sigma T$ values over various pH ranges can be selected.

The stability of the thermally engendered temperature gradient may be exhibited in carrying out the process of the invention by the stationary nature of the ampholyte condensation zones. A unique feature of the method of the present invention is the possibility of pH determination within the isoelectrically focused protein zones with a thermometric microprobe. This probe may be a thermistor or a fine, insulated wire serving as a resistance thermometer. Thus, the pH determination amounts to a temperature measurement which could yield the pH in the zone to better than 0.01 pH unit from the known pH versus temperature curve. This feature creates the possibility of characterization of proteins available only in minute amounts.

A particular advantage of the method of the invention is the possibility of varying the range and slope of the pH gradient simply by varying the temperatures of the fluids flowing through the chambers 18 and 20. There is actually no lower limit to the shallowness of the pH gradient which may be produced to enhance the resolving power of the system.

It may be pointed out that in order to separate a given pair of ampholytes, it is not necessary for the pH gradient to contain points of a pH equalling their pI values. It is merely necessary for it to contain a point of pH intermediate the two pI values. In such a case the two proteins will migrate in opposite directions toward the upper and lower boundaries of the M region where they will be condensed into sharp zones by conductivity gradient focusing, such focusing being described, for example, in an article by A. Kolin, J. Chem. Phys. 23, 407 (1955).

It is obvious that different types of buffer solutions may be used in the practice of the method of the invention, and that materials other than sucrose may be used to increase the density of the buffer solution so as to stabilize against thermal convection. Moreover, such stabilization against thermal convection may be achieved without density gradients by providing a conductivity gradient in a magnetic field, by rotation of the U-tube 10 about a horizontal axis, by means of porous media such as filter paper or other stabilizing matrices, laminar flow through a thin liquid curtain, and the like.

Also, it is evident that the temperature differential within the electrophoretic column may be established by means other than those illustrated in the drawing. For example, the electric current in the electrolyte may be used to establish a desired temperature gradient. When the electric current is used to establish the temperature gradient, the U-tube may have a trapezoidal or other selected configuration, so that the resulting heat generated by the electric current flow may be created with any desired temperature gradient, both uniform or non-uniform. The temperature gradient, moreover, may be created in discrete steps, or in discrete compartments, so as to as to achieve any desired resolution in the resulting isoelectric spectrum, and in selected parts of the spectrum. The container 10 need not ncessarily be a U-tube, and may be any type of vessel, cell, column, container, tube, or the like.

It may also be pointed out that the temperature differential created in the apparatus need not necessarily create a corresponding pH gradient in the buffer solution, since with various ampholyte mixtures, the pI of the various ampholytes may be temperature dependent. In that case, the buffer pH may remain constant, whereas the pI of the various ampholyte fractions may be controlled so as to distribute the resulting isoelectric points through the M region in the drawing. Specifically, therefore, the temperature gradient may be established to control either the pH of the buffer solution, or the pI of the ampholyte, or both. Moreover, the temperature differential may be used, in some instances, to establish a gradient in the (pH − pI) values of the ampholyte and buffer solution within the system.

It follows, therefore, that although a particular embodiment of the process of the invention has been shown and described, modifications may be made, and it is intended to cover all such modifications in the following claims.

What is claimed is:

1. A process for redistributing ampholytes, or the like, in an electrolytic buffer solution which comprises:
producing an electric current flow in a buffer solution containing at least one ampholyte in a direction to cause ions of the ampholyte to migrate electrophoretically in directions predetermined by factors including their isoelectric pH; and
establishing, in the buffered solution, a temperature gradient having a significant component substantially aligned with said current flow,
whereby the ions are redistributed in the buffered solution, and isoelectric focusing of said ampholyte takes place in the buffer solution.

2. The process defined in claim 1, in which the result of said process is a separation of said ampholyte from other components in the buffer solution, and including the further step of recovering said ampholyte.

3. The process defined in claim 2, and which includes the step of collecting the ampholyte at the isoelectric point thereof in said buffer solution.

4. The process defined in claim 1, in which said ampholyte is concentrated in the buffer solution.

5. The process defined in claim 1, in which said temperature gradient establishes a pH gradient in the buffer solution.

6. The process defined in claim 1, in which said temperature gradient establishes a gradient in the isoelectric pH of the ampholyte.

7. The process defined in claim 1, in which said temperature gradient establishes a gradient in the difference between the pH of the buffer solution and the isoelectric pH of the ampholyte.

8. The process defined in claim 1, in which said temperature gradient is established by circulating fluids of different temperatures in thermal contact with the buffer solution.

9. The process defined in claim 1, in which said buffered solution contains a plurality of ampholytes, and
said temperature gradient produces an isoelectric spectrum of the ampholytes in the buffer solution.

10. The process defined in claim 7 which includes the step of collecting the respective ampholytes individually at their respective isoelectric points in said buffered solution.

11. The process defined in claim 1, in which said buffer solution is stabilized against thermal convection currents.

12. The process defined in claim 1, in which said temperature gradient is produced in discrete steps.

13. The process defined in claim 1, in which said buffer solution is stabilized by a density gradient of a selected solute.

14. The process defined in claim 1, in which said buffer solution is introduced into a vessel of a selected configuration, and in which said electric current is provided by electrodes at the respective ends of said vessel.

15. The process defined in claim 14, including the step of creating said temperature gradient by circulating, in thermal contact with said vessel, a fluid having a temperature significantly different from that of said buffer solution.

16. The process defined in claim 14 including the steps of
creating said temperature gradient by circulating, in thermal contact with said vessel, a first fluid having a given temperature and
a second fluid having a temperature differing significantly from that of first fluid,
said thermal contact being at locations spaced along the direction of said current flow.

17. The process defined in claim 1, in which the migration of said ampholyte ions results in redistribution of the ampholyte, so that said ampholyte can be characterized by its isoelectric pH.

18. The process defined in claim 17, in which the characterization of said ampholyte by its isoelectric pH is effected thermometrically.

19. The process defined in claim 1, in which said temperature gradient is produced by generating heat within the buffered solution.

17. The process defined in claim 1, in which the migration of said ampholyte ions results in redistribution of the ampholyte, so that said ampholyte can be characterized by its isoelectric pH.

18. The process defined in claim 17, in which the characterization of said ampholyte by its isoelectric pH is effected thermomentrically.

* * * * *